United States Patent
Burch et al.

(10) Patent No.: US 8,603,690 B2
(45) Date of Patent: Dec. 10, 2013

(54) METHODS AND CONTROLS FOR HYDROGEN TO CATHODE INLET OF A FUEL CELL SYSTEM

(75) Inventors: Steven D. Burch, Honeoye Falls, NY (US); Bruce J. Clingerman, Palmyra, NY (US); Abdullah B. Alp, West Henrietta, NY (US); Jon R. Sienkowski, Rochester, NY (US); James K Leary, Rochester, NY (US); Victor W. Logan, Naples, NY (US); Daniel I Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 942 days.

(21) Appl. No.: 12/334,007

(22) Filed: Dec. 12, 2008

(65) Prior Publication Data

US 2010/0151284 A1    Jun. 17, 2010

(51) Int. Cl.
*H01M 8/04* (2006.01)

(52) U.S. Cl.
USPC ........... 429/433; 429/400; 429/408; 429/427; 429/429; 429/440

(58) Field of Classification Search
USPC .......... 429/415, 429, 400, 408, 427, 433, 440
See application file for complete search history.

(56) References Cited

U.S. PATENT DOCUMENTS

| | | | |
|---|---|---|---|
| 5,134,043 A | | 7/1992 | Nakazawa |
| 6,124,054 A | * | 9/2000 | Gorman et al. ............... 429/408 |
| 2003/0175567 A1 | * | 9/2003 | Willimowski et al. .......... 429/25 |
| 2005/0139076 A1 | * | 6/2005 | Ledford, Jr. .................... 96/102 |
| 2008/0014475 A1 | * | 1/2008 | Leboe et al. ..................... 429/13 |
| 2008/0152961 A1 | * | 6/2008 | Zhou et al. ...................... 429/13 |
| 2010/0035098 A1 | * | 2/2010 | Ramani et al. .................. 429/13 |

FOREIGN PATENT DOCUMENTS

| | | | | |
|---|---|---|---|---|
| JP | 2002-289237 | * | 10/2002 | ............. H01M 8/04 |
| JP | 2005-203263 | * | 7/2005 | ............. H01M 8/04 |

OTHER PUBLICATIONS

Federal Register, vol. 76, No. 27, pp. 7162-7175, issued Feb. 9, 2011, which details Supplementary Examination Guidelines for Determining Compliance with 35 U.S.C. 112 and for Treatment of Related Issues in Patent Applications.*

* cited by examiner

*Primary Examiner* — Ula C Ruddock
*Assistant Examiner* — Amanda Barrow
(74) *Attorney, Agent, or Firm* — John A. Miller; Miller IP Group, PLC

(57) ABSTRACT

A system and method for quickly heating a fuel cell stack at fuel cell system start-up. The fuel cell system includes a three-way valve positioned in the anode exhaust that selectively directs the anode exhaust gases to the cathode input of the fuel cell stack so that hydrogen in the anode exhaust gas can be used to heat the fuel cell stack. During normal operation when the fuel cell stack is at the desired temperature, the three-way valve in the anode exhaust can be used to bleed nitrogen to the cathode exhaust.

13 Claims, 1 Drawing Sheet

METHODS AND CONTROLS FOR HYDROGEN TO CATHODE INLET OF A FUEL CELL SYSTEM

BACKGROUND OF THE INVENTION

1. Field of the Invention

This invention relates generally to a system and method for heating a fuel cell stack at stack start-up and, more particularly, to a system and method for heating a fuel cell stack at cold stack start-up that includes directing anode exhaust gases from the fuel cell stack to the cathode inlet.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

An algorithm is typically employed to provide an online estimation of the nitrogen concentration in the anode exhaust gas during stack operation to know when to trigger the anode exhaust gas bleed. The algorithm tracks the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example, 10%, it would trigger the bleed. The bleed is performed for a duration that allows multiple stack anode volumes to be bled, thus reducing the nitrogen concentration below the threshold.

As is well understood in the art, fuel cell membranes operate with a controlled relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack.

The electrical conductance of a PEM fuel cell stack is a function of stack temperature and humidification. A fuel cell stack cannot produce full power when it is cold. To help quickly warm up a fuel cell stack, generally desirable at system start-up when the stack is below freezing, hydrogen is sometimes sent to the cathode side of the stack where it reacts with the cathode side catalyst and the oxygen to generate heat. Typically, fresh hydrogen from the anode input source is used for this purpose.

SUMMARY OF THE INVENTION

In accordance with the teachings of the present invention, a system and method are disclosed for quickly heating a fuel cell stack at fuel cell system start-up. The fuel cell system includes a three-way valve positioned in the anode exhaust that selectively directs the anode exhaust gases to the cathode input of the fuel cell stack so that hydrogen in the anode exhaust gas can be used to heat the fuel cell stack. During normal operation when the fuel cell stack is at the desired temperature, the three-way valve in the anode exhaust can be used to bleed nitrogen to the cathode exhaust.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for selectively providing anode exhaust gases to the cathode input of a fuel cell stack to heat the stack at cold start-ups is merely exemplary in nature, and is in no way intended to limit the invention or its applications or uses.

Figure 1:
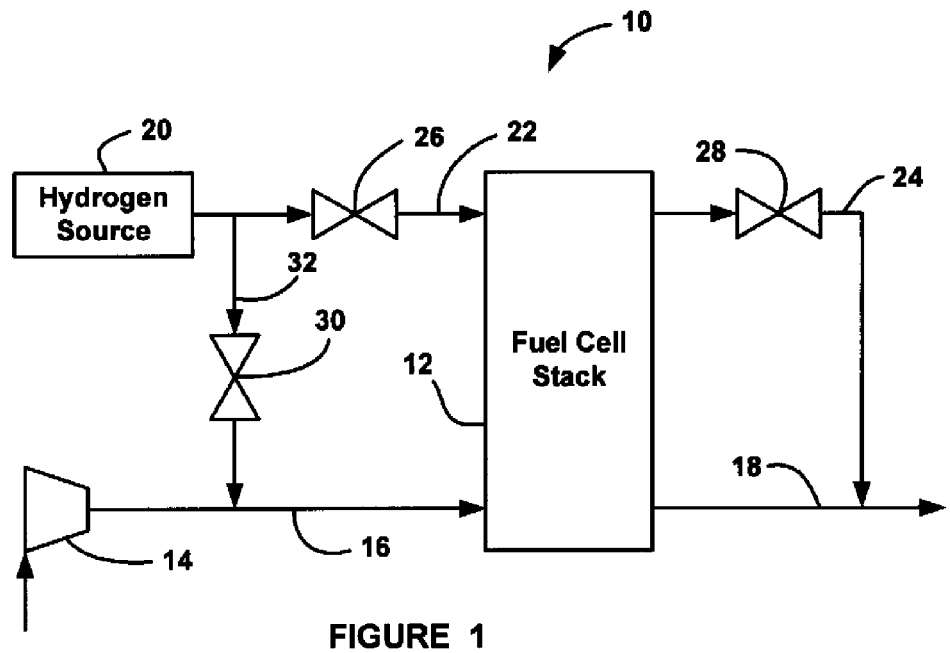
FIG. 1 is a schematic plan view of a known fuel cell system including a valve that selectively directs fresh hydrogen from a hydrogen source to a cathode input of a fuel cell stack.

FIG. 1 is a schematic plan view of a known fuel cell system 10 including a fuel cell stack 12. The fuel cell system 10 also includes a compressor 14 that provides cathode inlet air on a cathode input line 16 to the fuel cell stack 12. A cathode exhaust gas is output on a cathode exhaust gas line 18 from the stack 12. The fuel cell system 10 also includes a hydrogen source 20 that provides fresh hydrogen to an anode side of the fuel cell stack 12 on an anode input line 22. A controlled amount of anode exhaust gas is output from the fuel cell stack 12 on an anode exhaust output line 24. A high-pressure valve 26 closes the anode input line 22 when the fuel cell system 10 is not operating so as to contain the hydrogen within the hydrogen source 20.

An anode exhaust gas bleed valve 28 is provided in the anode exhaust gas line 24, and is periodically opened in association with an anode bleed algorithm so as to remove nitrogen from the anode side of the fuel cell stack 12. When the bleed valve 28 is open, the anode exhaust gas is directed to the cathode exhaust line 18 were it is diluted before being sent to the environment. Algorithms and control schemes are known in the art for bleeding nitrogen from the anode side of the fuel cell stack 12. Also, in an alternate embodiment, the fuel cell stack may be a split stack that employs anode flow shifting, well understood to those skilled in the art.

As discussed above, in one known technique for heating the fuel cell stack 12 at system starts, fresh hydrogen from the source 20 is sent to the cathode input line 16 on a by-pass line 32 through a by-pass valve 30 so that combustion with the cathode catalyst can be provided on the cathode side of the fuel cell stack 12 to bring the stack 12 to its operating temperature more quickly, especially at cold or freezing system starts. Control schemes for controlling the by-pass valve 30 are known to those skilled in the art that provides the desired amount of hydrogen to the cathode side of the fuel cell stack 12 based on system temperature, pressure, etc.

Figure 2:
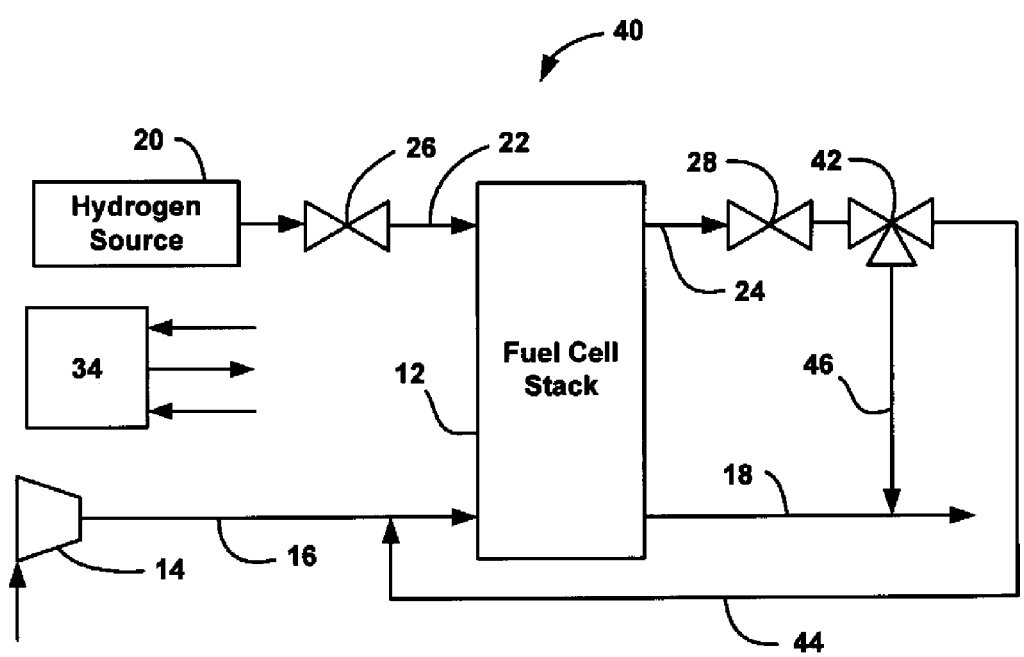
FIG. 2 is a schematic plan view of a fuel cell system that selectively directs an anode exhaust gas to a cathode input of a fuel cell stack or a cathode exhaust gas line, according to an embodiment of the present invention.

FIG. 2 is a schematic plan view of a fuel cell system 40 similar to the fuel cell system 10, where like elements are identified by the same reference numeral, according to an embodiment of the present invention. The fuel cell system 40 offers a number of advantages over the fuel cell system 10 by eliminating the process of directing fresh hydrogen from the hydrogen source 20 to the cathode input line 16 to heat the fuel cell stack 12 at system start-up. In this regard, the by-pass line 32 and the by-pass valve 30 have been eliminated. Instead of providing fresh hydrogen from hydrogen source 20 to heat the stack 12, the present invention proposes using the anode exhaust gas in the anode exhaust gas line 24 as the source of hydrogen to be combusted in the cathode side of the fuel cell stack 12. To accomplish this, the system 40 includes a three-way valve 42 positioned in the anode exhaust gas line 24 in combination with the bleed valve 28. During system start-up when it is desirable to provide hydrogen to the cathode side of the fuel cell stack 12, the bleed valve 28 is opened and the three-way valve 42 is controlled using control algorithms of a controller 34 so that the bled anode exhaust gas is directed to the cathode input line 16 on line 44. The amount of time that the three-way valve 42 is opened to the cathode input line 16 to get the proper amount of hydrogen in would depend on the specific system. During normal stack operation, when the stack 12 is at its operating temperature and when an anode exhaust gas bleed is commanded, the bleed valve 28 is opened and the three-way valve 42 is controlled so that the anode exhaust gas is directed to the cathode exhaust gas line 18 on line 46.

In this embodiment, the three-way valve 42 is always open, and either allows the gas to flow to the cathode exhaust gas line 18 or the line 44. That is why the bleed valve 28 is still needed. In another embodiment, a three-way valve that can be closed can replace the valve 42 in which case the bleed valve 28 can be eliminated.

One of the advantages of employing this approach of providing hydrogen to the cathode side of the fuel cell stack 12 is that the anode stoichiometry is increased over the heating technique shown in FIG. 1. The increase in anode stoichiometry provides an increase in the anode gas velocity and volumetric flow rate through the anode flow field of the stack 12 that enhances removal of nitrogen and water, including liquid water. It is effectively the same as a continuous, high-flow bleed, but instead of the hydrogen in the bled anode exhaust gas stream being dumped in the cathode exhaust gas line 18 and wasted, the hydrogen is used to provide the desired stack warm-up. A second advantage to the approach of the invention is the elimination of the by-pass valve 30. This is an advantage even though the three-way valve 42 is being added because the valve 30 is coupled to the hydrogen source 20, which is typically at high pressure, such as on the order of 500-750 kPh, where the valve 42 is a relatively low pressure valve, such as less than 150 kPh. A high pressure valve is typically more costly because of the additional requirements of the associated seals.

Further, the mechanization of the system 40 allows for the consumption of anode exhaust gas at other times when it is desired, such as during extended idle if heat is required to maintain stack temperature. Also, sending the anode exhaust gas to the cathode inlet will reduce the concentration of hydrogen exiting the vehicle through the tailpipe. Several hydrogen safety codes require that exhausted hydrogen be kept below 4% at all times and generally below 2%. Note that this will increase the thermal load of the vehicle radiator. According to another embodiment, the three-way valve 42 may be able to be eliminated entirely where the anode exhaust gas is always sent to the cathode inlet.

One of the fundamental problems with putting the proper amount of hydrogen into the cathode for cold starts is adjusting for cathode stoichiometry. Typically, the stack 12 requires a certain percentage of hydrogen to air during a cold start, where 4% is a typical value. The control algorithm can look at an air inlet meter, and determine how much moles/sec would be required for a 4% target. If the anode delivers that amount of hydrogen, then the cathode stream just prior to entering the stack 12 includes an accurate amount of hydrogen. As the air/hydrogen mixture enters the stack 12, the hydrogen combines with oxygen in the presence of platinum, and the amount of oxygen available for normal stack operation is reduced. This essentially reduces the desired cathode stoichiometry of the stack 12. If the airflow is increased to account for the amount that is consumed by the hydrogen, then the cathode air flow will go up and the hydrogen flow will increase accordingly. Many iterations of this logic loop ends up resulting in a steady and undesirable increase of hydrogen and air into the stack 12.

As can be determined by testing and fuel economy requirements, supplemental heating requirements of a fuel cell system would change with environmental and system variables. An example is determining the method of anode control based on cooling fluid temperature. In a system with three distinct states, exhausting 3% of hydrogen to the cathode inlet, exhausting hydrogen to the cathode inlet at normal operating intervals, and exhausting hydrogen to the cathode outlet flow can be provided.

Due to the characteristics of the materials used in PEM fuel cells, diffusion of nitrogen occurs from the cathode to the anode when the cathode is operating with air. This nitrogen build-up typically necessitates the use of exhaust valves on the anode sub-system of a fuel cell system. To control the flow through the anode exhaust valves, a characterized orifice is used to restrict flow. The pressure of the anode sub-system relative to the cathode system is modulated to produce the proper flow rate of gas through the orifice. This control method can be described by the equation:

$$\dot{n} \propto \frac{kv}{M} \cdot \sqrt{\frac{\rho(p_1^2 - p_2^2)}{T(K)}}$$

Where $\dot{n}$ is the molar flow rate through a valve, M is molar mass, kv is the flow coefficient constant of the valve, p is the density of the gas, $p_1$ is the pressure at the inlet of the valve, $p_2$ is the pressure at the outlet of the valve, and T is the temperature in the valve orifice in Kelvin.

Due to the difference in molar mass and density of hydrogen versus nitrogen, small partial pressures of nitrogen in the bleed stream can make a significant difference in the flow of hydrogen out of the exhaust valve. When used for supplemental heating during cold temperature start-up, precise control of the flow of hydrogen is desired. For practical applications, it is required to use a control algorithm that combines a nitrogen crossover model and a valve model to carefully meter hydrogen flow to the cathode.

One solution to this problem requires a proper algorithm. The moles/sec of oxygen desired by the stack 12 must be maintained for stack performance. The percentage of hydrogen requested and the oxygen that the stack 12 requires can be used to calculate the amount of oxygen that the hydrogen will consume. The compressor 14 is commanded to supply enough oxygen for the stack 12 and the hydrogen consumption, effectively raising the cathode stoichiometry to compensate for hydrogen consumption. The airflow through the cathode input line 16 will rise because of the additional airflow, but the measurement is adjusted to subtract out the extra oxygen consumed, and the adjusted airflow is what calculates the mole flow of hydrogen to be delivered to the anode of the stack 12. This prevents an increase in airflow and hydrogen flow to the cathode side of the stack 12 during stack warm-up. The system actually has less than the percentage of hydrogen desired, but the heat energy delivered will be the same as originally planned. The lower hydrogen percentage will help stay under the desired limit, and will also ensure emissions are met.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack having an anode inlet, a cathode inlet, an anode exhaust and a cathode exhaust;
    a hydrogen source providing hydrogen to the anode inlet of the fuel cell stack;
    a compressor for providing compressed air to the cathode inlet of the fuel cell stack;
    a three-way valve provided in the anode exhaust; and
    a controller that is programmed to control the hydrogen source, the compressor, and the three-way valve, said controller programmed to selectively control the three-way valve such that anode exhaust gas is directed to the cathode inlet during system start-up and to the cathode exhaust during normal operation when the stack is at a desired operating temperature such that the three-way valve eliminates the need for a by-pass valve coupled to the hydrogen source.

2. The system according to claim 1 further comprising a bleed valve in the anode exhaust for bleeding the anode exhaust gas to the cathode exhaust.

3. The system according to claim 1 wherein the controller is programmed to control the three-way valve to selectively direct the anode exhaust gas to the cathode exhaust when a nitrogen bleed is commanded.

4. The system according to claim 3 wherein the nitrogen bleed is commanded based on a nitrogen bleed algorithm of the controller.

5. The system according to claim 1 wherein the controller is further programmed to adjust cathode stoichiometry when the anode exhaust gas is provided to the cathode inlet so that a desirable ratio of compressor air to hydrogen in the fuel cell stack is provided.

6. The system according to claim 5 wherein the desired ratio of hydrogen to cathode air is about 2%.

7. The system according to claim 1 wherein the controller is programmed to control the three-way valve to selectively direct the anode exhaust gas to the cathode inlet during cold system starts.

8. A fuel cell system comprising:
    a fuel cell stack having an anode inlet, a cathode inlet, an anode exhaust and a cathode exhaust;
    a hydrogen source providing hydrogen to the anode inlet of the fuel cell stack;
    a compressor for providing compressed air to the cathode inlet of the fuel cell stack;
    a bleed valve provided in the anode exhaust for bleeding the anode exhaust gas to the cathode exhaust;
    a three-way valve provided in the anode exhaust; and
    a controller that is programmed to control the hydrogen source, the compressor and the three-way valve, said controller programmed to selectively control the three-way valve such that anode exhaust gas is directed to the cathode inlet when desired and to the cathode exhaust during normal stack operation when a nitrogen bleed is commanded, said three-way valve eliminating the need for a by-pass valve coupled to the hydrogen source.

9. The system according to claim 8 wherein the nitrogen bleed is commanded based on a nitrogen bleed algorithm of the controller.

10. The system according to claim 8 wherein the controller is further programmed to adjust a cathode stoichiometry when the anode exhaust gas is provided to the cathode inlet so that a desirable ratio of compressor air to hydrogen in the fuel cell stack is provided.

11. The system according to claim 10 wherein the desired ratio of hydrogen to cathode air is about 2%.

12. The system according to claim 8 wherein the controller is programmed to control the three-way valve to selectively direct the anode exhaust gas to the cathode inlet during cold system starts.

13. The system according to claim 1 wherein the three-way valve is not a high pressure valve.

* * * * *